United States Patent [19]
Godard et al.

[11] 3,879,681
[45] Apr. 22, 1975

[54] GAS LASER
[75] Inventors: Bruno Godard, Gif sur Yvette; Bernard Laxour, Palaiseau; Maurice Michon, Draveil, all of France
[73] Assignee: Compagnie General d'Electricite, Paris, France
[22] Filed: Nov. 19, 1973
[21] Appl. No.: 417,324

[30] Foreign Application Priority Data
Nov. 17, 1972 France .............................. 72.40939

[52] U.S. Cl. ........................... 331/94.5 PE; 330/4.3
[51] Int. Cl. .............................................. H01s 3/09
[58] Field of Search ................ 331/94.5 PE, 94.5 G; 330/4.3

[56] References Cited
UNITED STATES PATENTS
3,729,689   4/1973   Goddard ..................... 331/94.5 PE
3,757,248   9/1973   Small ......................... 331/94.5 PE Primary Examiner—James W. Lawrence
Assistant Examiner—B. C. Anderson
Attorney, Agent, or Firm—Sughrue, Rothwell, Mion, Zinn & Macpeak

[57] ABSTRACT

A gas laser. The active gas is placed in a slot provided in one of the two metal plates in a flat electric line. This line is charged and a rapid discharge is then produced on one side of the slot to produce a wave of current which excites the gas as it crosses the slot. Small metal plates are stacked between the two plates on the other side of the slot, one out of every two being connected to one plate and the other one to the other plate, thereby increasing the excitation current.

6 Claims, 11 Drawing Figures

GAS LASER

BACKGROUND OF THE INVENTION

1. Field of the Invention

The present invention relates to gas lasers, more particularly lasers in which a stimulated emission is obtained following an electric discharge in the active gaseous medium.

2. Description of the Prior Art

Gas lasers are already known which comprise a longitudinal cavity containing active gas and in which the electric discharge is obtained through a progressive wave of current being propagated in the active medium from one end of the cavity of the other at a speed equal to that of the propagation of a light emission stimulated in this cavity.

A gas laser of this type is described in the article "Traveling wave excitation of high power gas lasers", by John D. Shipman Jr., (Applied Physics Letters, vol. 10, No. 1, pages 3 – 4).

A gas laser of this type comprises a flat electric line comprising an insulating plate interposed between a first and a second metal plate on which different voltages are produced and excitation means for producing a discharge current in this line. The active gaseous medium is disposed in a longitudinal slot cut in the first metal plate of the line in the path of the discharge wave. The angle which the slot forms with the discharge wave is such that the speed of propagation of the discharge wave in the direction of the slot is equal to the speed of propagation of a light emission stimulated in the same direction.

To obtain a plane discharge wave, it hass been proposed that an edge of the first metal plate should have a parabolic shape and that a wave of current should be produced in this line, thereby producing a concentrated electric discharge between the metal plates at the level of the focal point of the parabola. The cylindrical wave which is produced at the focal point of the parabola is reflected on the edge in the form of a plane wave which is perpendicular to the axis of the parabola and which is propagated in the direction of this axis.

Irrespective of the manner in which the plane wave is produced, when it reaches the hollowed slot in the first metal plate it produces an electric discharge between the edges of this slot. It is this discharge which produces the excitation of the active gaseous medium in the slot, thereby enabling the laser emission to be produced. If it is wished to increase the energy of this laser emission, the energy of this discharge may be increased, the latter obviously being taken from the energy stored in the flat line during charging of this line. To this end, the surface of the line may be increased or the thickness of the insulation between the metal plates may be reduced or the voltage at which the line is charged may be increased. In practice, none of these solutions enables the energy of the discharge between the edges of the slot to be increased as much as necessary.

SUMMARY OF THE INVENTION

The object of the present invention is to increase the energy of this discharge.

The present invention relates to a gas laser comprising: a flat electric line comprising a first and a second metal plate which are parallel to each other and separated by an insulating layer, at least the first plate being provided with a rectilinear slot separating it into a first and a second part; an excitation generator for producing different voltages on the plates; a triggering circuit for producing a rapid electric discharge between the first part of the first plate and the second plate so as to produce in this line an electric discharge wave which is both progressive and plane and which encounters the slot and is inclined on this slot; means for containing an active gaseous medium in this slot, characterized in that a plurality of small plates are disposed between the second plate and the second part of the first plate, these small plates being parallel to the other plates and being separated from each other and from said plates by an insulating layer so as to form a stack, the height of which is substantially coextensive with the thickness of the first part of the first plate, the second part of the first plate constituting a first small plate of this stack, said small plates and the insulating layer situated between these small plates being limited on the side of the slot so that they do not reach the first part of the first plate, and in that the slot extends substantially over the height of the stack.

The excitation generator produces a first voltage on the first small plate, a second voltage on the second small plate and produces the first voltage on the third plate, and so on. The first and second voltages are produced on the small plates of the odd and even rows respectively, these first and second voltages being selected so that when the discharge wave reaches the slot, a discharge is produced across this slot between the first part of the first plate and the small plates in the odd rows.

Other objects, features and advantages of the present invention will be made apparent from the following detailed description of the preferred embodiment thereof when reference is had to the accompanying drawings provided by way of non-limitative examples only.

DESCRIPTION OF THE PREFERRED EMBODIMENTS

Figure 1:
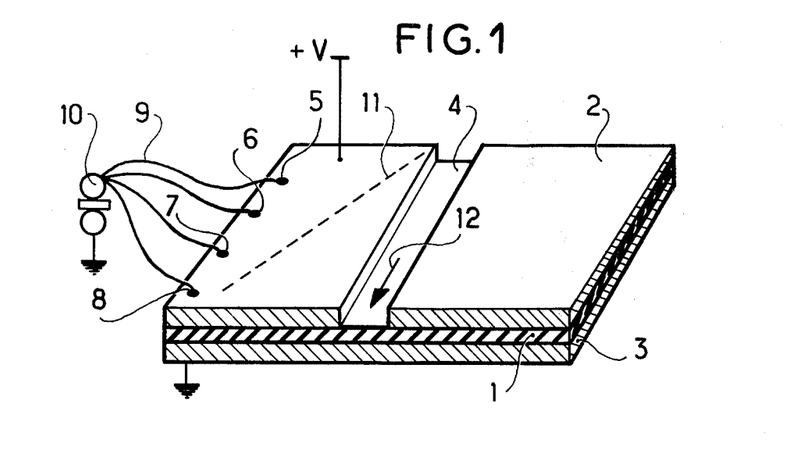
FIG. 1 is a diagrammatic, perspective view of a first known gas laser.

FIG. 1 represents a known gas laser. This laser comprises a flat electric line comprising an insulating plate interposed between two metal plates 2 and 3 which are parallel to each other and on which different voltages are produced.

A longitudinal slot is provided in the plate 2 to contain an active gaseous medium at normal pressure. For example, this active medium may be a gas such as air or nitrogen under normal pressure.

The laser comprises means for producing punctiform discharges in the insulating plate 1 at the level of the points, 5, 6, 7, and 8. These points are aligned, for example, on a straight line parallel to the direction 12 of the slot 4. The excitation means comprise an impulse generator 10 connected respectively to the points 5, 6, 7 and 8 by coaxial cables such as the cable 9.

The cables 9, which are of different lengths, constituted variable delay lines and transmit successively at 5, 6, 7 and 8, an impulse emitted by the generator 10.

The nature of the surfaces of the spherical discharge waves produced in the dielectric at the level of the points 5, 6, 7 and 8 is a progressive wave surface represented diagrammatically at 11 and forming an angle with the direction 12 of the slot.

The progressive wave surface 11 reaches the different elements of the active medium in succession in the direction of the arrow 12. It excites this active medium and creates a stimulated emission which is propagated in the direction 12.

Figure 2:
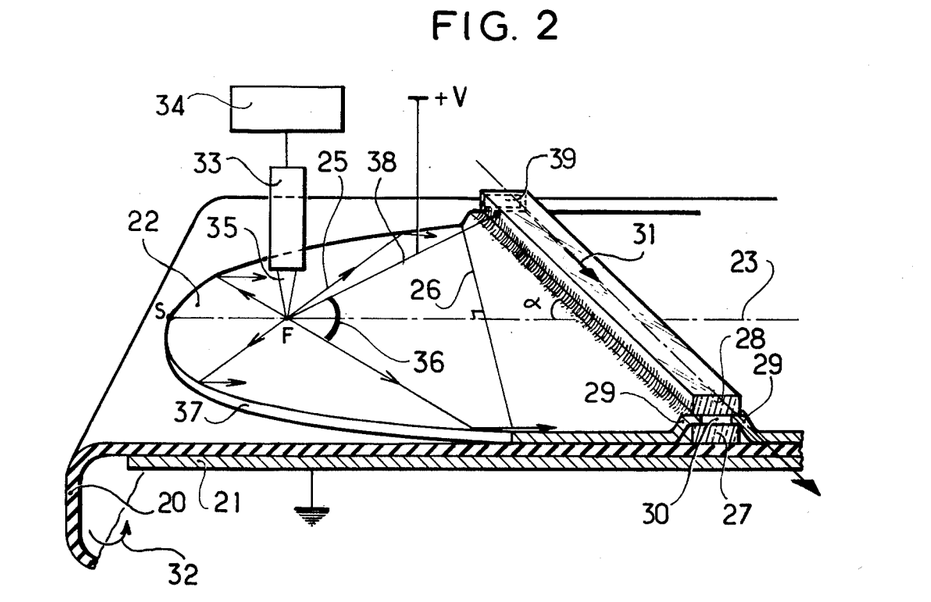
FIG. 2 is a diagrammatic, perspective view of a second known gas laser.

FIG. 2 represents a diagrammatic perspective view of another known laser generator.

This laser generator comprises a flat line comprising an insulating plate 20 disposed between a first metal plate 22 and a second metal plate 21, on which different voltages are produced.

The insulating plate 20 is advantageously a sheet which may possibly be wound, unrolled or drawn along between the plates 21 and 22 by means of a mechanical device which is very briefly indicated in diagrammatic form at 32.

One of the ends of the plate 22 is in the form of a parabola 37 having an axis 23, a focal point F and a tip S.

The laser comprises means for producing a substantially punctiform electric discharge at the level of the focal point F of the parabola 37. The excitation means consist, for example, of an auxiliary laser generator 33 controlled by an electronic element 34 and capable of emitting light impulses 35 focussed at the level of the focal point F of the parabola 37. The laser generator 33 is regulated in such a manner that the energy is sufficiently high for the metal plate 22 and the insulating plate 20 to be pierced at the level of the focal point.

The rising time of the front of the discharge wave is advantageously less than twice the propagation time of a discharge wave in the flat line between the focal point F and the tip S of the parabola (this time is, for example, on the order of a nanosecond).

The laser generator 33 may be replaced by a mechanical point piercing tool of the plate 20 or even by a voltage generator capable of producing a discharge in the plate 20 at the level of the focal point F, or by any other similar device.

The plate 22 is provided with a slot 30 separating it into two separate parts where the active laser medium is stored.

If air under atmospheric pressure is being used, it is not necessary to close the section where the gas is contained. On the other hand, the gaseous medium may be enclosed by means of an insulating sheet 28 disposed in front of the slot 30 and secured, for example, by means of an adhesive, to the two edges of this slot. A second sheet 27 disposed on the insulating plate 20 is advantageously disposed opposite to the insulating sheet 28. In this case, the edges of the slot are provided with elbows between the sheets 27 and 28.

The ends of the section containing the gas are closed by two windows, one of which is represented in diagrammatic form at 39.

The angle of the axis of the parabola with the slot 30 is selected in such a manner that its cosine is equal to the relationship between the speed of a propagation of a discharge wave in the line in the direction defined by the axis 23 and the speed of propagation of a light emission in the direction of the slot 30.

The ends of the axis of the slot advantageously intersect the plates 22 in two points of the parabola 37.

A reflector 36 consisting, for example, of a pierced point of the plate 22 in the form of an arc of a circle centered on the point F is disposed on the side opposite to the S with respect to the focal point F. Its transversal dimensions are limited by two straight lines joining F to the end points of the slot 30, for example, the line 38.

This gas laser operates in the following manner: at a given moment the generator 33 emits a light impulse which pierces the sheet 20 at the level of the focal point F of the parabola 37. The discharge wave emitted has a symmetry of revolution with respect to the focal point F. The fraction of the surface of the discharge wave comprised in the angle defined by the line 38 and its homolog is reflected by the reflector 36.

All the waves emitted at the level of the focal point F are thus directed towards the parabola 37 and are reflected on this parabola. It is known that the parabola is perfectly stigmatic for two conjugate points - its focal point F and infinity. The surface of the wave coming from F and reflected by the parabola is thus a perfectly plane wave surface perpendicular to the axis 23 of the parabola 37 and represented by its joint 26.

The progressive discharge wave 26 reaches successively in the direction of the arrow 31, the atoms or molecules of the active gas. The stimulated light emission is thus produced from one end to the other of the slot in the direction of the arrow 31 at the same speed as the progressive wave 26 in the direction of this slot. This condition enables very powerful, coherent laser radiation to be obtained at the output of the slot 30

After the emission of a laser impulse, the insulating sheet disposed between the plates 21 and 22 is displaced, for example, by unrolling it at 32 so as to move the pierced point at the level of the focal point F to the other side of the point S. This insulating sheet may, for example, consist of an organic polymer known under the commercial name of Mylar.

The excitation line of the laser is then in the operating state.

The embodiments of the triggering circuit described above make it possible to obtain extremely good results, but nevertheless they do have a disadvantage in that after each utilization of the laser generator it is necessary to replace the dielectric separating the two metal plates at the level of the focal point.

Figure 3:
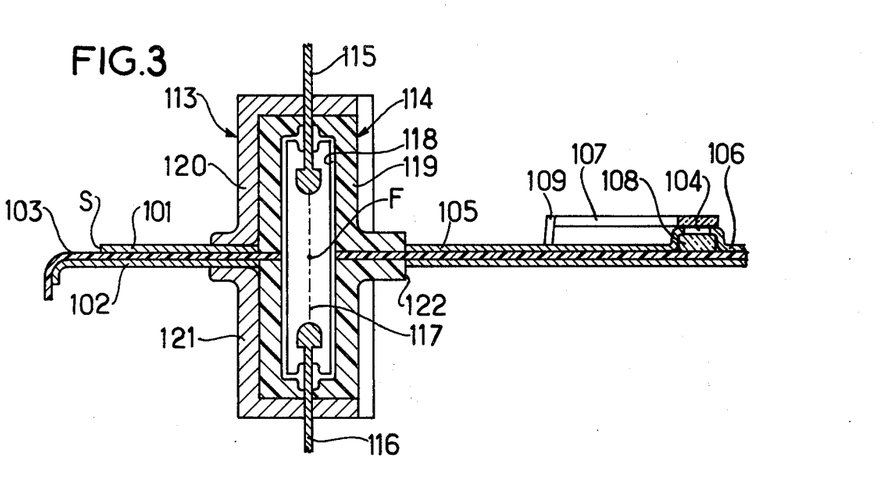
FIGS. 3 and 4 represent respectively a sectional view and a view from above of an embodiment of the triggering circuit of a laser generator according to FIG. 2.
Figure 4:
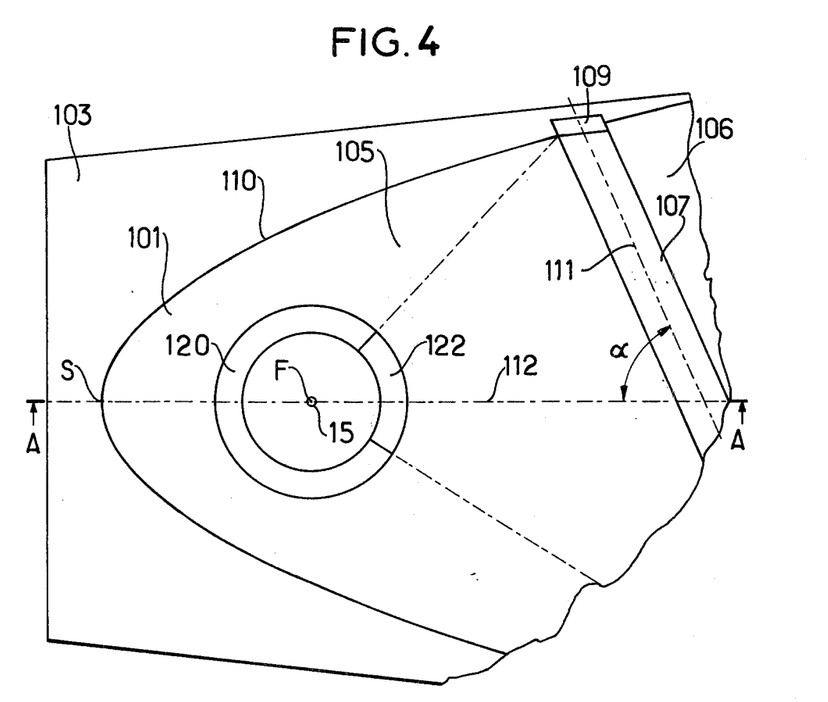

In the laser generator shown in FIGS. 3 and 4, the triggering circuit enables this disadvantage to be avoided.

The generator shown in FIGS. 3 and 4 comprises two metal plates 101 and 102 separated by a plate of insulating material 103, these three plates being stacked against each other such that the metal plates 101 and 102 are substantially parallel. The metal plate 101 comprises at a certain distance a slot 104 separating this plate into two separate parts 105 and 106. This slot 104 which may constitute a cavity containing an active gaseous laser medium is enclosed in a sealed manner, for example, by means of two plates of dielectric material 107 and 108 in the longitudinal direction of this slot on either side of the parts 105 and 106 of the plate 101 and is closed at the two ends of the slot, for example, by two optical windows, one of which may be transparent. An optical window of this nature is represented at 109 in the figure. The edge 110 of the plate 101 is shaped so as to form a parabola having a focal point F and a tip S, the slot 104 being provided in the plate 101 in such a manner that it is situated on the other side of the focal point F with respect to the tip S of the parabola.

The axis 111 of this slot obviously forms an angle which is not zero with the axis 112 of the parabola.

The laser generator thus comprises a triggering circuit 113 consisting of a container 114 containing a gas such as a mixture of a nitrogen and hydrogen or $SF_6$ (sulfur hexafluoride) in which are disposed respectively two electrodes 115 and 116 on an axis 117 passing generally through the focal point F of the parabola defined by the edge 110 of the plate 101. The container 114 crosses the plates 101 and 102 respectively and is made of a dielectric material. In an advantageous embodiment, this container comprises an inner casing 118 consisting, for example, of a glass vessel, on the wall of which are secured the electrodes 115 and 116, a second outer casing 118 consisting preferably of a molded material being disposed about the inner casing 118. To avoid electrical discharges between the plate 101 and the plate 102, the plate of dielectric material 103 penetrates the outer casing 119 as far as the inner casing 118 so that a part of the lateral outer surface of the outer casing 119 covers the part of this dielectric plate which is located on the very periphery of the inner casing 118. The laser generator also comprises means for connecting the electrodes 115 and 116 respectively to the metal plates 101 and 102 and preferably in such a manner that the electric paths between the electrodes and the respective plates are equal. These electrical connecting means may consist, for example, of metal parts 120 and 121 connected respectively to the electrodes and to the plates on only one part of the periphery of the outer casing 119 of the container 114, excepting the peripheral part of the container 114 constituting a high electric impedance 122 which is made, for example, from part of the dielectric material constituting the outer casing 119 so that the electric wave being produced substantially about the focal point F is not propagated directly towards the slot 104 but is reflected on the parabolic edge 110 of the plate before reaching the slot 104.

Figure 5:
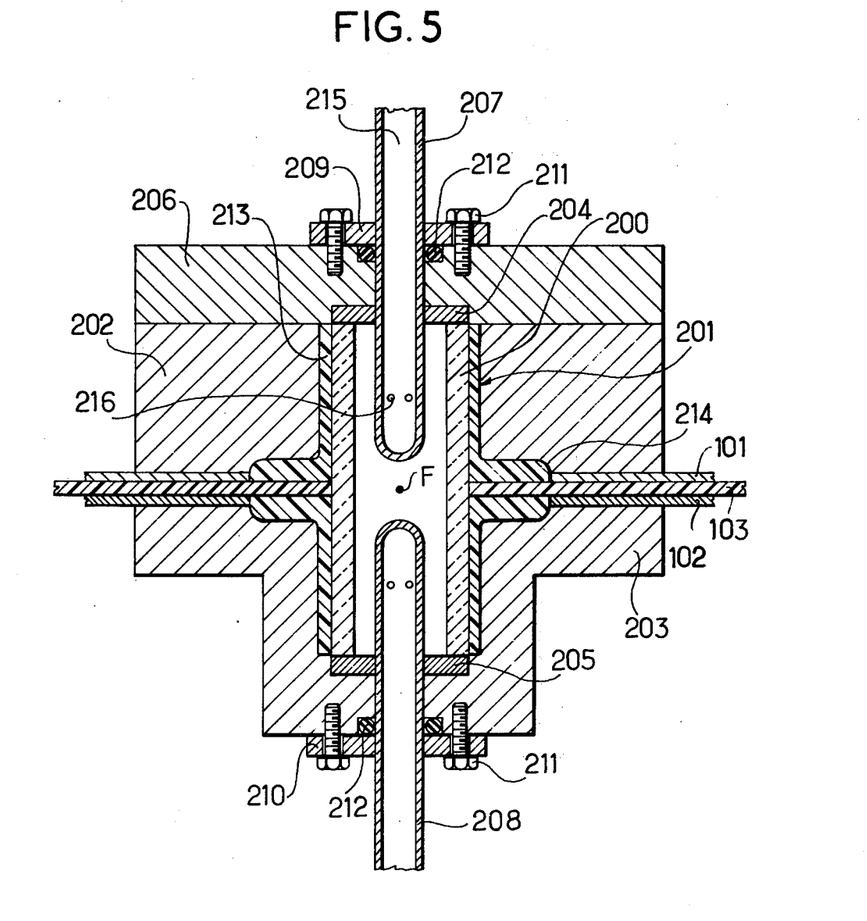
FIG. 5 is a sectional view of another embodiment of a triggering circuit of a laser generator according to FIG. 2.

FIG. 5 shows the metal plates 101 and 102 disposed on either side of the insulating plate 103 constituting the plane electric excitation line used in the laser generator described with reference to FIGS. 5 and 6.

Concerning the circuit for triggering a discharge at the level of the focal point F of the parabola constituting the plate 101, this circuit comprises a glass tube 200 disposed in a bore hole 201 provided in two metal masses 202 and 203 coming to bear on the plates 101 and 102 respectively. The ends of the tube 200 are sealed by means of flat joints 204 and 205. In addition, a metal plate 206 comes to rest against the mass 202 and this plate is crossed as well as the joint 204 by one of the electrodes 207 while the mass 203 and the joint 205 are crossed by another electrode 208. These electrodes are secured to the mass 203 and to the plate 206 by way of discs 209 and 210 tightened by way of screws such as 11, toroidal joints 212 being advantageously interposed between the discs and the corresponding metal plate.

FIG. 5 also shows plastic material 213 cast in the bore hole 201 about the tube 200 and in the orifices 214 provided on the faces opposite to masses 202 and 203 such that this plastic material, on the one hand, covers the insulating plate 103 on the periphery of the bore hole 201 -that is, on both its faces, and on the other hand, is disposed in contact with the end of the plates 101 and 102. It will be noted that the electrodes 207 and 208 each comprise a central conduit 215 cooperating with the openings 216 for discharging a gas, in this case nitrogen, into the tube 200.

It will be noted that a triggering circuit of this type has a particularly simple structure which enables the electrodes to be reached very easily by simply dismantling the various constitutive parts. In the structure which has been described it is extremely simple to fulfill two conditions ensuring the good operation of the laser: the triggering circuit should have a low inductance so that triggering is rapid and produces a steep-fronted wave in the flat line. It is also essential for the triggering circuit to be well adapted to the impedance of the flat line so as to avoid parasitic reflections.

Figure 6:
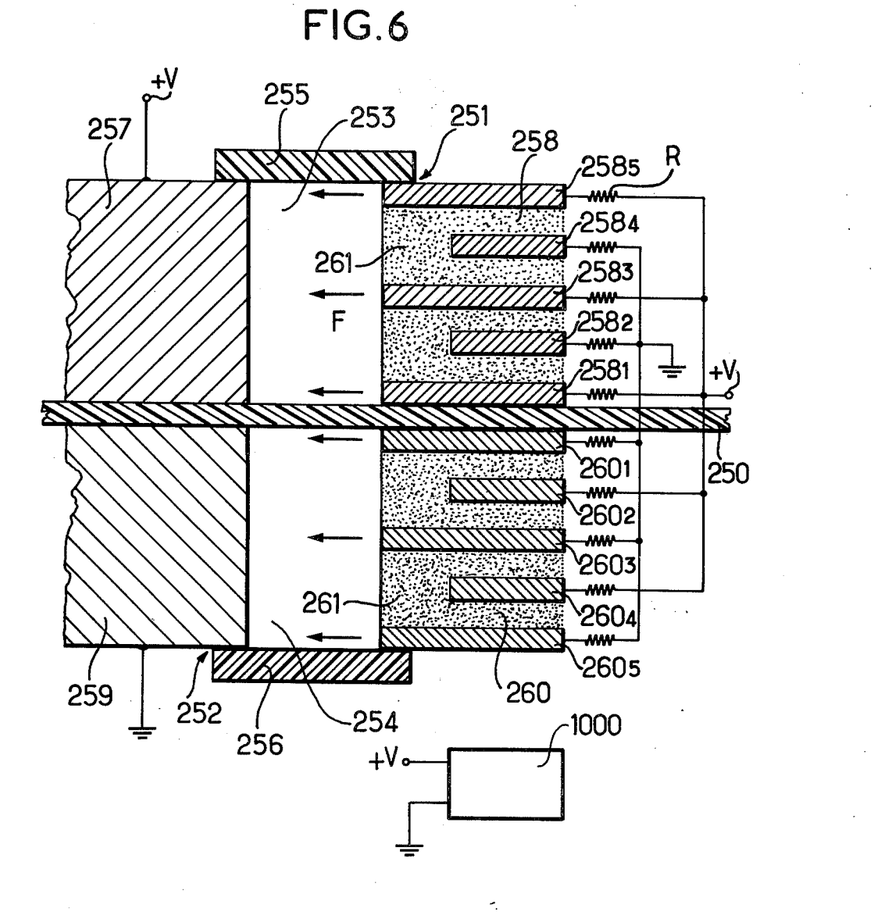
FIG. 6 represents a sectional view of a first embodiment of a laser according to the invention comprising the elements represented in FIG. 2.

The laser according to the invention shown in FIG. 6 comprises a flat electric excitation line consisting of an insulating plate 250 disposed between a first metal plate 251 and a second metal plate 252. Slots 253 and 254 are provided in the plates 251 and 253 respectively and enclose an active gaseous medium, in this case nitrogen, these slots being sealed by means of insulating sheets 255 and 256 respectively.

This structure obviously also comprises a circuit triggering a wave of current, windows sealing the ends of the slots 253 and 254 and other elements described with reference to the preceding figures. A description of these will not be repeated at this point.

As FIG. 6 shows, the metal plates 251 and 252 are separated into two separated parts by the slots 253 and 254 respectively, these being the parts 257 and 2585 for the plate 251 and the parts 259 and 2605 for the plate 252.

The parts 257 and 259 are bulky and shaped in the form of a parabola as described above. The parts 2585 and 2605 which are disposed opposite to the triggering circuit form the first small plates from the outside of a stack of conducting plates separated from each other by an insulating layer 261 consisting of an insulating sheet or a resin such as araldite. The part 2585 is thus connected to the small plates 2581, 2582 .... 2584 and the part 2605 is connected to the plates 2601, 2602 ....

2604. It will also be noted that the small plates bearing odd indices are longer than the plates bearing even numbers and that the ends of the small plates in an odd row emerge at the level of the insulating layer 261 opposite to the parts 257 and 259 of the plates 251 and 252.

In addition, the small plates in the odd rows 2581 – 2585 of the part 258 are connected in parallel to the small plates of the even rows 2602 and 2604 of the part 260 and the entire assembly is connected to one of the terminals of an excitation generator. The small plates in the even rows 2582, 2584 of the part 258 are also connected in parallel to the small plates in the odd rows 2601 .... 2605 of the part 260 and the entire assembly is connected to the other terminal of the generator, these connections being made by way of resistances such as R.

Figure 7:
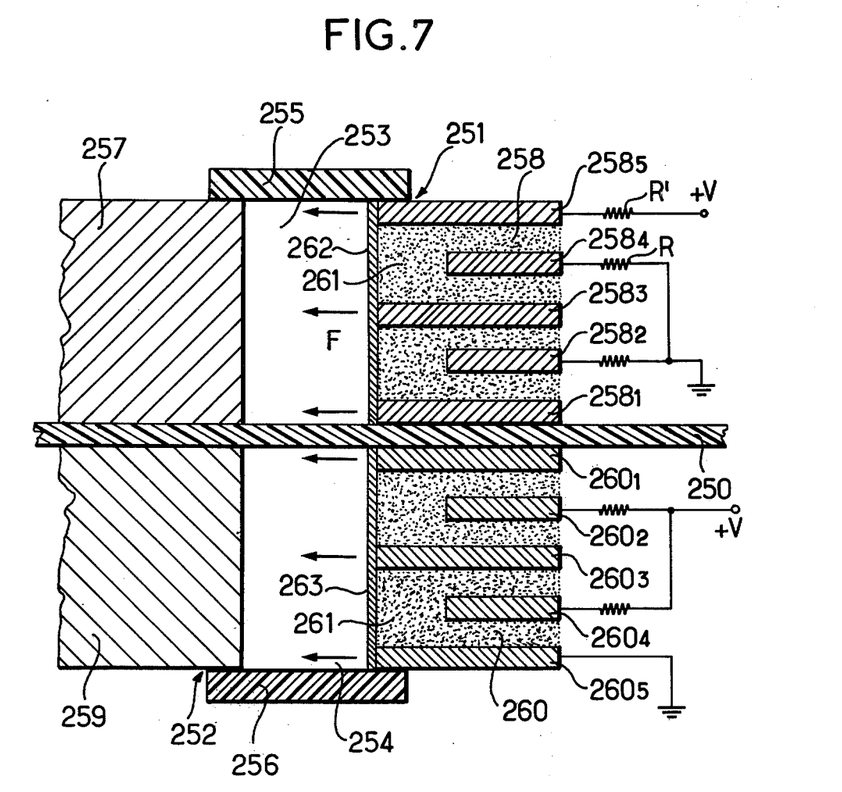
FIG. 7 is a sectional view of a second embodiment of a laser according to the invention comprising the elements represented in FIG. 2.

According to FIG. 7, a variant consists in interconnecting in parallel all the plates in the even rows of the parts 258 and 260 while the small plates in the odd rows 2581 .... 2585 of the part 258 are interconnected by way of a sheet 262 constituting a wall of the slot 253 and in that the small plates in the odd rows 2601 .... 2605 of the part 260 are connected by a sheet 263.

Resistances R, R' are provided to link these connections to the terminals of the excitation generator.

The operation of this type of laser as a whole is substantially similar to that described above and will not be repeated at this point.

However, it will be noted that when the punctiform discharge is being produced between the parts 257 and 259 of the plates 251, 252 at the level of the focal point of the parabola, the instantaneous voltages of the parts 257 and 259 are essentially V/2. A discharge which is essentially as indicated by the arrows F (FIG. 1) is thus produced.

It will also be noted 115 the metal plates cooperate with the intercalary insulator to provide condensors connected in parallel. that In this way, high capacities are made available which enable a high power to be obtained with minimal losses.

Figure 8:
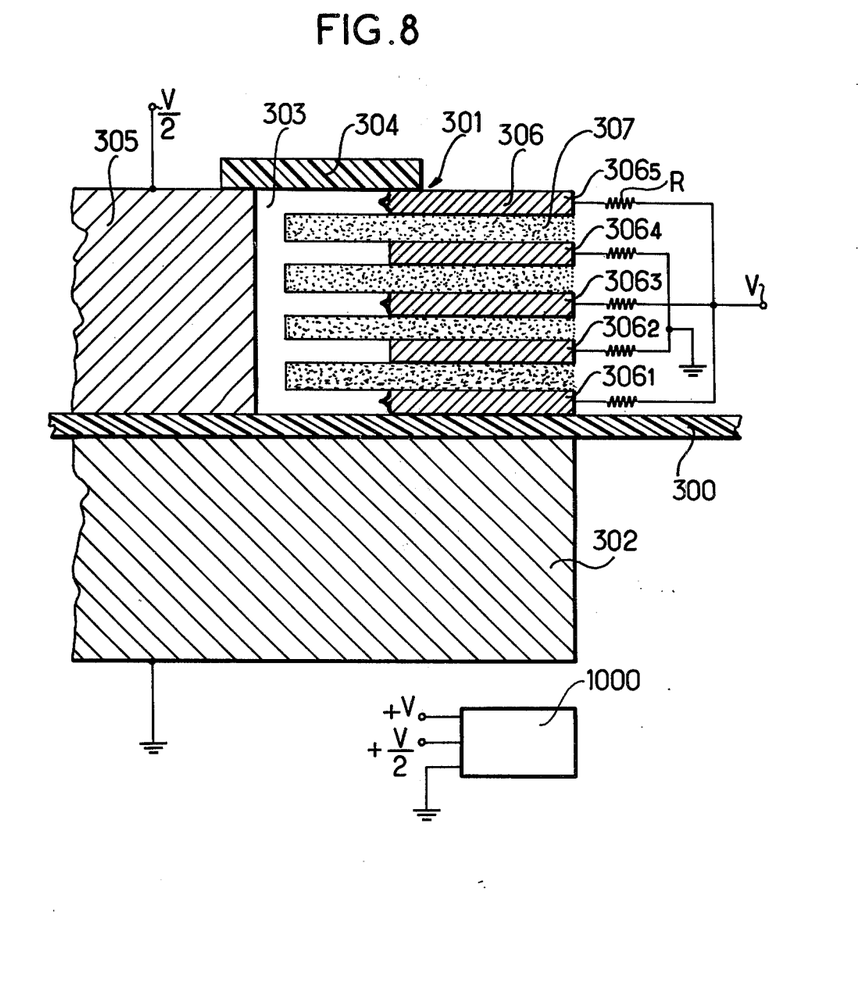
FIG. 8 represents a sectional view of a third embodiment of a laser according to the invention comprising the elements represented in FIG. 2.

The laser shown in FIG. 8 comprises a flat electric excitation line consisting of an insulating plate 300 disposed between a first metal plate 301 and a second metal plate 302, a slot 303 being provided in the plate 301 and enclosing an active gaseous medium, in this case nitrogen, this slot being sealed by means of an insulating sheet 304.

This structure obviously also comprises a circuit triggering a wave of current, windows sealing the ends of the slot 303 and other elements as described with reference to the preceding figures, a description of hich will not be repeated at this point.

As FIG. 8 shows, the metal plate 301 is divided into two separate parts 305 and 3065 by the slot 303 which is 20 mm wide. The part 305 disposed on the side of the triggering circuit is solid and is in the form of a parabola as described above. The other part 3065 consists of the upper plate of a stack of conducting plates 3061, 3062 .... 3065 being lengthwise flat and 4 mm in thickness. They are separated by an insulating layer 307 consisting of a polyamide sheet, 75 microns in thickness and known under the commercial name "Kapton". It will be noted that the insulating layer extends from the end of the plates inside the slot 303 over a length of 15 mm.

The second metal plate 302 is solid and may also be parabolic in shape.

The small plates in the odd rows 3061 – 3065 are connected in parallel and the overall assembly is connected to one of the terminals of an excitation generator 1000 while the small plates in the even rows 3062, 3064 are also connected in parallel and the assembly is connected to the other terminal of the generator. These connections are made by way of resistances such as R. The small plates in the odd rows have a crest on the side of the slot which facilitates the triggering of a discharge.

An excitation generator of this type is able to provide a voltage V of 6 kV. In the embodiment represented, the small plates in the odd rows are at a voltage V and the small plates in the even rows are connected to the ground.

The part 305 of the first metal plate 301 and the second metal plate 302 are connected to another terminal of the generator 1000 capable of providing a voltage of V/2, the voltage V/2 being produced on the part 305 and the plate 302 being connected to the ground.

The operation of a laser of this type is substantially similar to that described above and will not be repeated at this point.

However, it will be noted that during the punctiform discharge being produced between the plates 305 and 302 and at the level of the focal point of the parabola (as described with reference to FIG. 2), the voltages between the plates become zero. As a result, a discharge is produced between the plates 3061, 3063 and 3065 on which a voltage V is produced, and the part 305 of the first metal plate 301.

It will be noted that the extension of the insulating layer 306 inside the slot 303 has the effect of preventing untimely triggering between adjacent plates.

In addition, the use of a voltage equal to V/2 between the part 305 of the plate 301 and the plate 302 makes it possible to avoid triggering in the active gaseous medium before operation of the triggering circuit.

Figure 9:
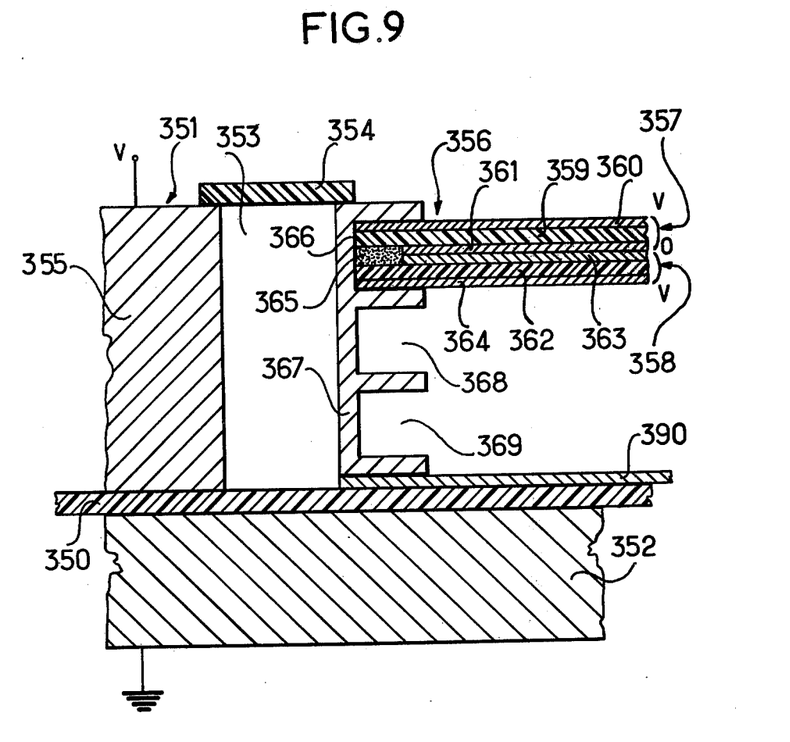
FIG. 9 is a sectional view of a variant of a laser according to the invention.

The laser shown in reference to FIG. 9 comprises a flat electric excitation line comprising an insulating plate 350 disposed between a first metal plate 351 and a second metal plate 352, a slot 353 being provided in the plate 351 and enclosing an active gaseous medium, in this case nitrogen. This slot is sealed by means of the insulating sheet 354.

This structure obviously also comprises a circuit triggering a wave of current, windows sealing the ends of the slot 353 and the other elements described above.

As FIG. 9 shows, the metal plate 351 is divided into two separate parts 355 and 356 by the slot 353 which is 1 cm wide. The part 355 disposed on the side of the triggering circuit is solid and has a parabolic shape, while the other part 356 consists of groups of two stacked elements such as 357 and 358 which are substantially identical and comprise for the element 357 and insulating layer 359 disposed between two layers of copper 360 and 361 and for the element 358 an insulating layer 362 disposed between two layers of copper 363 and 364.

As FIG. 9 shows, the inner copper layers 361 and 363 are in mutual contact and are not as long as the outer layers 360 and 364. Insulating material 365 such as silastic is disposed at the end of the inner copper layers 361 and 363.

The unit comprising the two elements 357 and 358 is engaged in a recess 366 of an armature 367 which also comprises the recesses 368 and 369 for receiving pairs of elements similar to the elements 357 and 358. The armature 367 rests on a metal plate 390 which is disposed on the insulating plate 350. The outer copper layers 360 and 364 are connected to one of the terminals of an excitation generator producing a voltage V and the inner copper layers 361 and 363 are connected to the other terminal, in this case at a voltage of zero.

Figure 10:
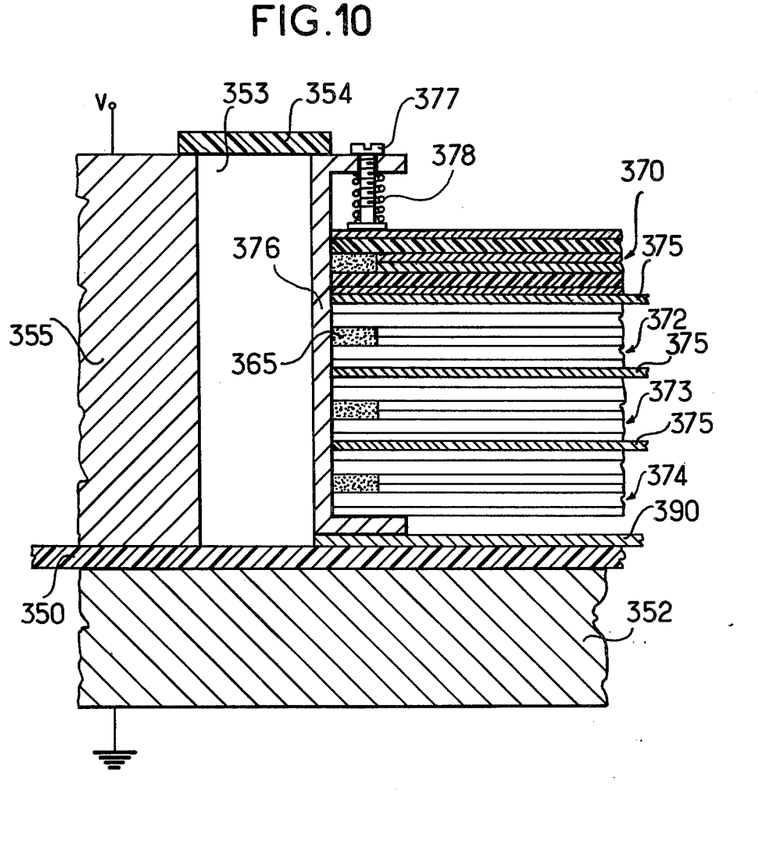
FIG. 10 is a sectional view of another variant of the preceding type.

FIG. 10 shows another variant in which the elements designated as a whole by 370, 372, 373, 374, identical to the elements 357 and 358 described above are stacked one against the other through the intermediary of wedges 375 and are gripped within an inverted U-shaped armature 376 by means of a screw 377 cooperating with a spring 378. The connections to the poles of the generator are provided for each element as illustrated in FIG. 15.

Figure 11:
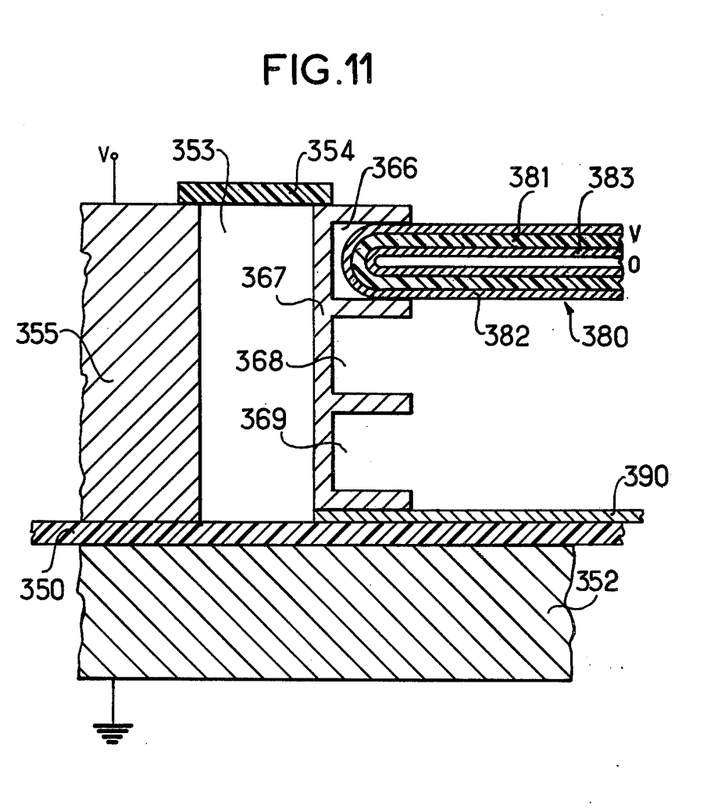
FIG. 11 represents a sectional view of another variant of the preceding type.

In the second embodiment shown in FIG. 11, an armature 367 identical to that described in FIG. 9 receives in each of its recesses 366, 368, 369, which are 3mm in height and 10 mm in depth - measured horizontally in the figure - an element such as the element 380 comprising an insulating layer 381 consisting of an organic polymer such as the one known under the commercial name of Mylar which is 75 microns thick and is disposed between two layers of copper 382 and 383 having a thickness of 35 microns. This element is bent back on itself as shown in the figure. Referring to the description provided with reference to the FIGS. 6 and 7, it is possible to state that each of the recesses such as 366 contains the end bent into a U-shape of an insulating layer, the two faces of which are covered with a metal layer. The inner metal layer constitutes a small plate in an even row and the outer metal layer is in contact with the edges of the recess and constitutes on the side of a branch of the U a part of a small plate in an odd row and on the side of the other branch of the U a part of another small plate in an odd row.

A voltage V is produced on the layer 382 while the layer 383 is connected to the ground. The voltage V may, for example, be 6 kV.

In each case, the part 355 of the first metal plate 351 and the second metal plate 352 are connected to the terminals of the generator. A potential V or possibly V/2 is produced at the part 355 and the plate 352 is connected to the ground.

It should be noted that the insulating layer 365 has the effect of preventing untimely triggering between the copper layers on which different voltages are produced.

What is claimed is:

1. A traveling wave transmission line system for excitation of a laser having an active laser medium, comprising:
    a flat electric line comprising a first metal plate (22, 23, 257, 2585, 305, 3065) and a second metal plate (21, 259, 2605, 302) which are parallel and separated from each other by an insulating layer (20, 250, 300), at least said first metal plate being provided with a rectilinear slot (30, 253, 303) separating it into a first part (22, 257, 305) and a second part (23, 2585, 3065), said first part being formed as a parabola with an axis of symmetry at an angle to the longitudinal axis of said channel,
    a voltage generator (1000) producing different voltages on said plates,
    excitation means (33, 34) for producing at the focus of said parabola a rapid electric discharge between the first part of said first plate and said second plate so as to produce in this line a progressive and plane electric discharge wave encountering said slot,
    means for containing an active gaseous medium in said slot; and characterized in that a plurality of small metal plates (258, 2582, 2583, 2584, 3061, 3062, 3063, 3064) are disposed between said second plate 2605, 302) and said second part (2585, 3065) of the first plate these small plates being parallel to said first and second plates and separated one from the other and from said first and second plates by insulating layers so as to form a stack, the height of which is substantially coextensive with the thickness of said first part (257, 305) of the first plate, said second part of said first plate constituting a first small plate of this stack, said small plates and the insulating layers situated between these small plates being confined to one side of said slot (253, 303) so that they do not reach said first part of the first plate on the other side of said slot, said slot extending substantially over the height of said stack,
    said voltage generator (1000) producing a first voltage on said first small plate (2585, 3065), a second voltage on said second small plate (2584, 3064), said first voltage on the third of said plates (2583, 3063) and so on, said first and second voltages being produced on the plates in the odd rows and even rows respectively, this first and second voltage being selected in such a way that when said discharge wave reaches said slot (253, 303), a discharge is produced across this slot between said first part of the first plate (257, 305) and said small plates in the odd rows (2585, 3065, 2583, 2581, 3063, 3061).

2. A system according to claim 1, characterized in that said small plates in the even rows (2582, 2584) are separated from said slot (253) by an electric insulator.

3. A system according to claim 2, characterized in that said small plates in the odd rows (2585, 2583, 2581) are interconnected by a metal part (262, 367, 373) forming a wall of said slot (253).

4. A system according to claim 1, characterized in that all of said small plates (3061, 3062, 3063, 3064) reach said slot (303) and are separated from each other by an insulating layer extending from the end of said small plates inside said slot, said voltage generator (1000) producing said second voltage on said second plate (302) and producing an intermediate voltage between said first and second voltage at the first part (305) of the first plate.

5. A system according to claim 3, characterized in that said metal part (367) consists of an armature comprising on the side opposite to said slot (353) a plurality of recesses (366, 368, 369) extending parallel to the length of said slot and each containing a small plate of an even row (361, 383) surrounded by two metal layers (360, 364, 382) in contact with the two edges of the recess (366), and each metal layer constituting a part of one of said small plates in an odd row.

6. A system according to claim 5, characterized in that each (366) of said recesses contains the U-shaped end of an insulating layer (381), the two faces of which are covered by a metal layer (382, 383), the inner metal layer (383) constituting a small metal plate of an even row and the outer metal layer (382) being in contact with the two edges of the recess (366) and constituting on the side of one branch of said U a part of a small plate in an odd row, and on the side of the other branch of said U, a part of another small plate in an odd row.

* * * * *